Sept. 29, 1959  D. C. KENNARD, JR  2,906,117
VIBROMETER

Filed Aug. 5, 1955  3 Sheets-Sheet 1

INVENTOR.
DWIGHT C. KENNARD, JR.
BY
ATTORNEYS

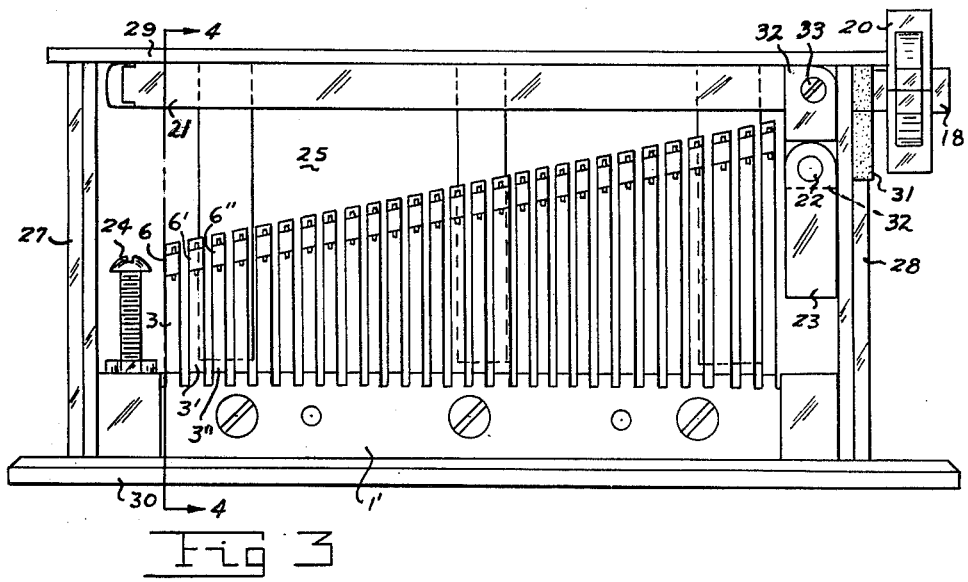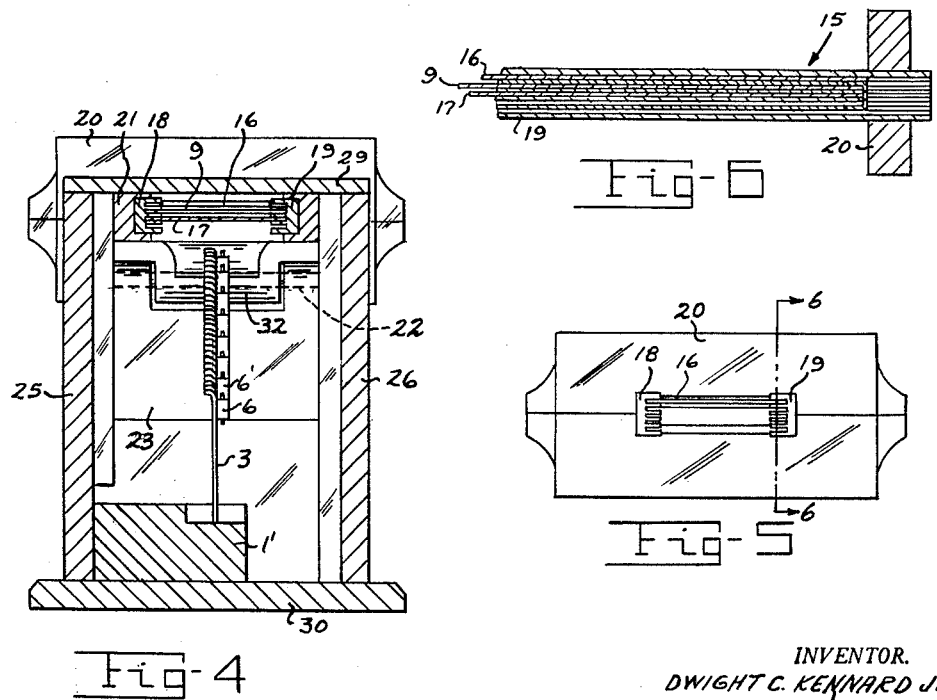

Sept. 29, 1959  D. C. KENNARD, JR  2,906,117
VIBROMETER
Filed Aug. 5, 1955  3 Sheets-Sheet 3
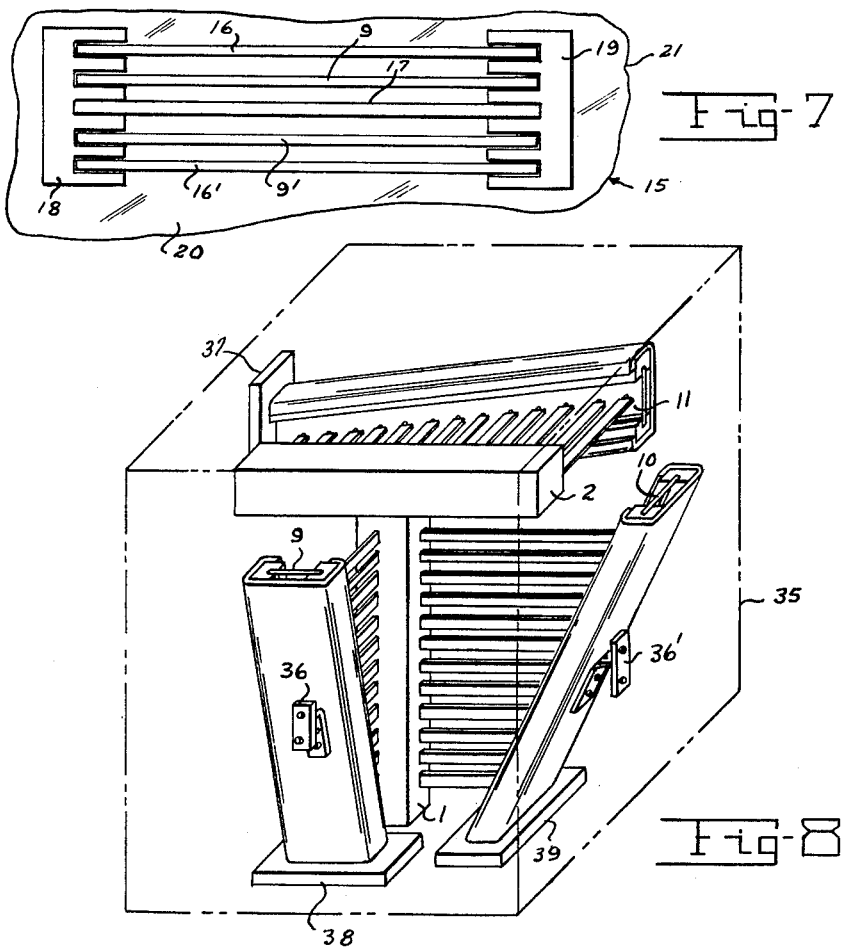
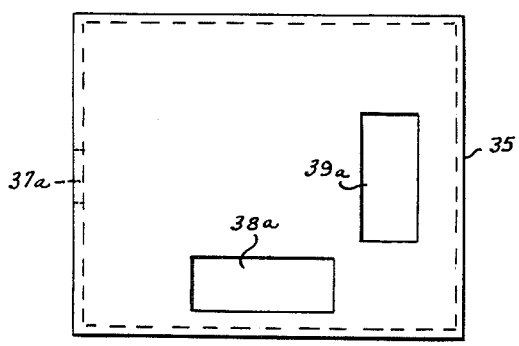
INVENTOR.
DWIGHT C. KENNARD, JR.
BY Wade Koontz
Orlando M. McCoy
ATTORNEYS United States Patent Office 2,906,117
Patented Sept. 29, 1959

2,906,117

VIBROMETER

Dwight C. Kennard, Jr., Dayton, Ohio

Application August 5, 1955, Serial No. 526,792

5 Claims. (Cl. 73—70.2)

(Granted under Title 35, U.S. Code (1952), sec. 266)

The invention described herein may be manufactured and used by or for the United States Government for governmental purposes without the payment to me of any royalty thereon.

This invention relates to vibrometers or to statistical vibration analyzers. The word "statistical" as used herein means of or pertaining to facts which can be stated in numbers, or in tables of numbers. The present invention relates particularly to an instrument for detecting and for recording the presence, the magnitude and the persistence in each of three spatial dimensions, of force components existing as vibrational or mass displacement forces.

As a background for insuring a sufficient understanding of this invention as claimed and to make the invention clearly understandable, studies of mass or body displacements resulting from acceleration, deceleration, vibration, oscillation and the like, require the detection of the body displacement from a static state in terms of force components projectible separately on the three mutually normal planes: horizontal, vertical and profile, or three-dimensional movement, in terms of responsiveness, in magnitude, in period, in association and in complexity. Body displacement detecting, indicating and recording instruments which have been available heretofore have commonly depended upon mass inertia, the seismograph principle, torsion action, pendulum action and the like. Illustrative instruments consist of levers, reeds, springs, counterpoises, light sources, mirrors, prisms, housing, scales, pointers, electromagnets, tubes, circuitry and the like.

A general statement of the nature and the substance of the present invention, as claimed herein, comprises a vibrometer, or a statistical vibration analyzer whose nature is to be excited into synchronization selectively by the frequencies in the planes of force components into which acting forces are resolved. The substance of the present invention as claimed, comprises a vibration transmitting frame attachable to a body to be subjected to spatial displacement, three sets of vibratable, excitable reeds of graduated lengths in three planes normal to each other, the reeds cantilever supported from the frame, with each reed tipped with a photoactive energy source at its unattached end, and a film in a film holder positioned sufficiently close to the unattached reed tips to be exposed locally thereby, whether displacement occurs or not, with all of the above listed parts inclosed within a light-tight box.

A general statement object of the invention as claimed is to provide within a light-tight box in nature and in substance as claimed, a series of vibrationally excitable reeds of progressively increasing length in each of three planes, the planes being normal to each other and the reeds being separately cantilever mounted on a supporting frame, the frame to be attached to a body to the subjected to displacement, and each reed tipped at its unattached end with a radioactive material, a light source or the like, adjacent to a photographic film in a film holder and providing a photographic record of the force component occurrence, its relative persistence, its amplitude and its duration at each frequency which excites a reed in the vibrometer which is contemplated hereby.

Another object is to provide a mechanical, self-sufficient vibration analyzer to be firmly mounted upon a displaceable object to detect the presence of any displacement of the object, together with the direction and the relative magnitude of the displacement.

Another object is to provide a vibration analyzer which, upon being attached to an article subject to vibration, detects and records the occurrence of the vibration, the level and the severity of the vibration, its frequency and its direction, without requiring a person in attendance or any services from an attendant during the making of such recordings, other than for the installation and the removal of the equipment.

A further object is to provide a recording vibration analyzer instrument adapted for being mounted at strategic positions and positions which may be difficult of access within aircraft or the like.

Another object is to provide a new and an improved vibration analyzer instrument which detects and records the presence of, the levels of and the frequencies of displacements or vibrations in particular members to which it is attached.

Another object is to provide an instrument which can supply suitable precision records for formulating vibration specifications for concerned members of an aircraft or other structure, to which one or more of the vibration analyzing devices may be attached.

An illustrative embodiment of the present invention is represented in the accompanying drawings wherein:

Fig. 3 is a side elevational view of one set of reeds in a complete sensing unit with its own housing;

Fig. 4 is a sectional elevational view taken from the line 4—4 of Fig. 3;

Fig. 5 is an end view of the hand gripped portion of the film holding slide in Fig. 3;

Fig. 6 is a sectional view taken along the line 6—6 in Fig. 5;

Fig. 7 is a fragmentary enlarged end view taken from adjacent the left hand end of the film holding slide in Fig. 3;

Fig. 8 is a perspective view of the assembly shown in Fig. 1 enclosed within a box shown in phantom; and Fig. 9 is a diminished elevational view of the box in Fig. 8 showing the holes in the sides through each of which a film holding slide is removably inserted for each of the three sets of vibrating reeds within the box.

Figure 1:
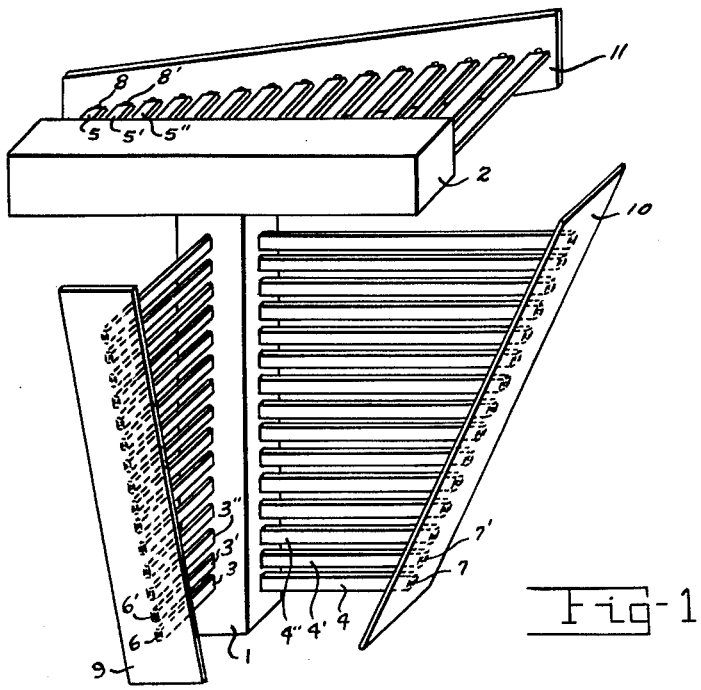
Fig. 1 is a perspective view of two frames bearing three sets of reeds of progressive lengths in planes normal to each other with a film holder adjacent the light source tips of each reed.

The vibration analyzer shown in Fig. 1 comprises a rigid upright vibration transmitting frame 1 which may be adapted in a desired manner for having its base attached firmly to a member or a body of which a displacement or a vibration analysis is to be taken. The upright rigid frame 1 is crossed at its upper end by an equally rigid vibration transmitting cross frame 2.

The upright rigid frame 1 supports in vertical planes normal to each other two series of beams or reeds 3, 3', 3", etc. and 4, 4', 4", etc., with each series substantially within a single plane. In the horizontal plane normal to the planes of both of the series of reeds 3 and 4, a third series of coplanar reeds 5, 5', 5", etc. are supported by the rigid cross frame 2.

All of the three disclosed systems of reeds are mounted on the cantilever principle by being supported at an attached end and by being free to flex freely along the minor axis of their cross sections. Each of the beams or reeds illustratively may be of rectangular cross section. The frame 1, cross frame 2, and the three series of reeds supported thereby, as one part of an assembly, are attached to a mass or a body, the displacement of which is to be detected and recorded. The frame and reed assembly is associated with a film holder assembly which comprises a plurality of film holders, shown in Figs. 3 to 6, inclusive, which support films 9, 10 and 11. The films 9, 10 and 11 are so mounted as to record the mass displacement to which the frame and reed assembly is subjected. The combined assemblies are inclosed within a light-tight box, as shown.

Each series of coplanar reeds comprises a plurality of reeds which vary uniformly from a minimum to a maximum length, for providing a regular progressive gradation of their natural frequencies. The three sets of uniformly graduated reeds so mounted may be excited by a frequency or a combination of frequencies which are characteristic of an external source of vibration under investigation affecting the body or mass to which the analyzer is attached.

The described positioning of the three series of reeds in planes mutually perpendicular to each other so orients the reeds that some reeds are sensitive to and vibrate in direction and in magnitude with the vertical plane, others with the horizontal plane and still others with the profile plane force components of any complex vibratory force to which the reeds are subjected.

No outside source of energy is required to actuate the recording functions of the device. The reed tips may bear a desired form of energy source, not shown, applicable to suitable permanently retaining energy recorders and the like, within the scope of the present invention.

Figure 2:
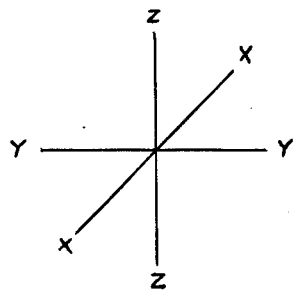
Fig. 2 is a graph which represents the planes of the reeds in Fig. 1.

With reference to Fig. 1, vibration force components within the plane of the paper and vibrating to the right and to the left or along the Y—Y axis of Fig. 2, initiate and maintain for the period of such vibration sympathetic vibratory motion in the reeds 3, 3', 3", etc. Vibratory force components normal to the plane of the paper or along the X—X axis of Fig. 2, initiate and sustain vibrations in the series of reeds 4, 4', 4", etc. Vibration force components directed up and down within the plane of the paper or along the Z—Z axis of Fig. 2, initiate and sustain corresponding vibratory motion in the series of reeds 5, 5', 5", etc. The graduated lengths of the three series of reeds within a prescribed range provide a reed of a vibratory period preferably approximately that of the vibration period to which the supporting body will be subjected.

The unattached end of each reed in all of the three series of reeds carries or is coated with a radioactive or a phosphorescent material or an equivalent, in ample quantity and strength to expose a spot or a line on a photographic film 9, 10 or 11 positioned nearby and preferably in a plane about normal to the longitudinal axis of the reed. The photographic film is within a preferably immovably supported film holder, not shown, and preferably not affected by the vibrations to which the frames 1 and 2 are subjected.

Illustratively, a film 9 is mounted adjacent the radioactive or phosphorescent tips 6, 6', etc. of the series of reeds 3, 3', etc. A film 10 is mounted adjacent to the radioactive or the phosphorescent tips of the series of reeds 4, 4', etc. and a film 11 is mounted adjacent to the radioacive or the phosphorescent tips of the series of reeds 5, 5', etc.

With this equipment a particular reed in the series 3, 3', etc., may be excited into vibration by a corresponding force component acting through the rigid frames 1 and 2. The phosphorescent tips 6, 6' etc. at the end of the particular reed exposes the film 9 to a length indicative of the energy content and of the persistence of the acting force component. In a similar manner, that reed most nearly tuned to the directional vibration component in the supporting body in each of the three series of reeds, imparts a maximum exposure to that area of the film nearest it.

Upon the completion of a particular application of the described vibration analyzer mounted upon a body subjected to vibratory motion for a predetermined period, the three strips of film are removed and are developed and analyzed. The traces on the three pieces of film which traces are produced by the radioactive material on the unattached reed tips will vary in length and in intensity according to the severity of the particular component of vibration, the frequency of vibration and how often each frequency of vibration occurred.

It will be apparent that each trace on each film indicates the frequency of the horizontal, the vertical or the profile series of reeds which persisted during any particular test. The traces on the developed films of those reeds which were not excited will appear as dots and will indicate the absence of an appreciable vibration component normal to the plane of the series of reeds and of a frequency characteristic of the particular reed leaving a dot as a photographic trace. Reeds excited infrequently will make traces which are more faint on the developed film than those excited more frequently.

In this manner the three developed films derived from a particular run indicates an average severity at the particular frequency of the individual reeds and the repetition of the occurrence of vibratory reed action of the three series of reeds. The three strips of developed film resulting from each recording provided an analysis of the vibration to which the body supporting the vibration analyzer is subjected within the period of time the vibrometer was attached to the device being tested.

The three developed films so obtained provide a permanent precision record in terms of force components normal to the three axes caused by the actual vibrations to which the supporting body has been subjected over the time period of the particular test and independently of the complexity of the vibration waves causing the displacement of the supporting body.

A modification of the vibration analyzer contemplated hereby and not represented in the accompanying drawing comprises, in the absence of radioactive or phosphorescent material, a light source carried on the unsupported tips of the individual reeds. The light source serves in a comparable manner in imparting a dot or a line to an adjacent film and to appear thereon when the film is developed.

The statistical vibration analyzer which is contemplated hereby provides on its three developed films an accurate and a permanent recording of the absence or of the presence of any displacement of the mass or the body to which the device is attached. In the presence of displacement the analyzer provides an indication of the direction along which the displacement force components act. It distinguishes between frequencies and by relative image densities it indicates relative recurrence or persistence of occurrence. The analyzer dissects displacements independently of their complexities of direction, frequencies, magnitudes and persistence. The analyzer functions automatically and accurately and it provides a permanent and a reproducible recording.

The diagrammatic vibrometer represented in Fig. 1 of the drawings is reduced to practice by a metal device to be attached to the vibration transmitting frames 1 and 2 diagrammatically illustrated in Fig. 1 of the accompanying drawings. The presentation is made more clearly understandable by its being limited to one set of reeds and one frame in the showing in Figs. 3 to 6, inclusive, of the accompanying drawings of an objective embodiment of the invention limited to the single set of reeds 3, 3', 3", etc. in one plane with the understanding that this device may be duplicated in each of the three planes normal to each other contemplated in Fig. 1 of the accompanying drawings. Reference numerals in Figs. 3 to 6 of the drawings correspond with reference numerals in Fig. 1 for the reeds 3, 3', 3", etc. attached to a representative frame 1'.

In Fig. 3 the frame 1' supports a plurality of the reeds 3, 3', 3", etc. which reeds respectively bear at their unattached ends energy emitting tips 6, 6', 6", etc. in common for both Figs. 1 and 3. Film 9 slips into slots on opposite sides of a slide 15. A protective cover 16 of dull black paper, plastic or the like, is inserted in slots outwardly of the film 9 and accessible for being withdrawn toward the right when an exposure of the film is to be made as is commonly done in photographic practice.

The slide 15 preferably consists of a plate 17 between two side rails 18 and 19 mounted at their right hand end in a support 20 to spring slightly laterally at their left hand end away from the side edges of the plate 17 to maintain a yieldingly snug fit in a slide receiving and mounting frame 21. The frame 21 is grooved on either side and at its left hand end, such that the left end of the slide 15 may be inserted from the right hand end of the frame 21 and the slide 15 may be moved toward the left until it is seated within the grooves of the frame 21. The right hand end of the frame 21 is attached by screws 33 to a U-shaped yoke 32. The mid-portion of the yoke 32 is offset below its ends and is apertured as a journal for the pin 22. The upper edge of the support 23 is cut away to receive the mid-portion of the yoke 32 therein with the opposite ends of the pin 22 secured in apertures in the support 23, as shown. The support 23 is secured by screws to the end plate 28 of the box that encloses the assembly. The frame 21 has its right hand end hinged on the pin 22 such that its left hand end may be depressed to a desired degree in bringing the film 9 in a plane parallel to the slant of the reed tips 6, 6', 6", etc. as determined by the adjustment of a screw 24 which threads into the frame 1' of the device. The left hand end of the frame 21 contacts the head of the screw 24 in which position the photographic exposure is made. The screw 24 may be secured in its adjusted position by a lock nut or the like, if preferred.

An outside casing for the device is provided and may consist of sides 25 and 26 and ends 27 and 28 secured to a casing bottom 30, all of which is secured to the frame 1' with screws or the like. A removable cover 29 closes the top of the outside casing. A felt pad 31 is secured to the right hand end of the device to provide a light arresting seal which makes wiping engagement with the bottom side of the slide 15. In Fig. 3 the set of reeds 6, 6', 6", etc. mounted on the frame 1 are shown in the plane of the paper.

The slide 15 is patterned on photographic practice in that it contains films or plates protected from light both before and after exposure. An enlarged end view of the slide is shown in Fig. 7 wherein film 9 and 9' on opposite sides of a metal plate 17 are protected by exposure sealing covers 16 and 16'. Each slide carries two films to be separately exposed by the sequential withdrawal of the covers 16 and 16' for the sequential exposure of both films on the inversion of the slide, followed by the replacement of the covers and the development of the films, as is an established photographic practice.

The slides are supported in a box 35 by brackets 36, 36', etc. which extend therebetween and are attached to both. Three slides 37, 38 and 39 in the phantom box 35 in Fig. 8 are inserted in holes 37a, 38a and 39a respectively, in the sides of the box 35 in Fig. 9.

The box 35 imparts vibrations through its sides to the frame members 1 and 2 and from the frame members to the reeds supported thereby.

Additional modifications functioning in comparable ways may be made in the described vibration analyzer without departing from the scope of the present invention.

What I claim is:

1. A statistical vibration analyzer, comprising a rigid upright vibration transmitting frame member, a transverse vibration transmitting frame member secured to an end of the upright frame member, a plurality of series of vibratable reeds of progressive lengths cantilever mounted on said frame members in three planes mutually normal to each other, an energy emitting tip on the unattached end of each reed, and means for recording vibrational activity of the tips on a plurality of said cantilever mounted reeds.

2. A vibrometer, comprising a plurality of vibratable reeds mounted in sets in each of three planes normal to each other, a vibration transmitting rigid frame-work supporting said sets of reeds by cantilever mounting remote from unattached reed tips, an energy emitting source at the reed tips, and film means adjacent the reed tips and recording any relative displacement thereof.

3. A statistical vibration analyzer, comprising a plurality of reeds mounted in sets of graduated vibration frequencies in each of three planes normal with respect to each other, the rigid frame-work supporting the sets of reeds for conducting vibrational forces, energy emitting means at the unattached tips of a plurality of said reeds, and film means supported adjacent the energy emitting means on the reed tips to be exposed locally thereby.

4. A statistical vibration analyzer, comprising a plurality of reeds of different frequencies of vibrational response in each of three planes normal with respect to each other, a rigid frame-work supporting the reeds, an energy emitting means at each of the unattached tips of a plurality of said reeds, and film means supported adjacent the energy emitting means on the reed tips.

5. A three dimensional vibrometer comprising a vibration transmitting frame, a plurality of reeds of progressively uniformly increasing lengths and vibration characteristics and with leads of comparable lengths in each of three planes mutually normal to each other and the reeds cantilever mounted by one attached end of each reed being secured to the frame and the reeds being sympathetically responsive to displacements of the frame such that a displacement of the frame may initiate a responsive vibration in a reed, and means for identifying the reed responding to the displacement of the frame.

References Cited in the file of this patent

UNITED STATES PATENTS

| | | |
|---|---|---|
| 759,513 | Frahm | May 10, 1904 |
| 1,416,550 | Frank | May 16, 1922 |
| 1,869,828 | Shrader | Aug. 2, 1932 |
| 2,429,094 | Kent et al. | Oct. 14, 1947 |
| 2,445,304 | Grace | July 13, 1948 |
| 2,536,870 | Burmist | Jan. 2, 1951 |

FOREIGN PATENTS

| | | |
|---|---|---|
| 487,393 | Germany | Dec. 11, 1929 |